H. F. CRIM & W. C. LOY.
LOCK FOR AUTOMOBILES.
APPLICATION FILED DEC. 23, 1908.

931,685.

Patented Aug. 17, 1909.
2 SHEETS—SHEET 1.

Witnesses
J. P. Britt
E. C. Duffy

Inventors
Henry F. Crim
William C. Loy

By
O. E. Duppresau
Attorneys

H. F. CRIM & W. C. LOY.
LOCK FOR AUTOMOBILES.
APPLICATION FILED DEC. 23, 1908.

931,685.

Patented Aug. 17, 1909.
2 SHEETS—SHEET 2.

Witnesses
T. P. Britt
E. C. Duffy

Inventors
Henry F. Crim
William C. Loy
By
O. E. Dufresau
Attorneys

# UNITED STATES PATENT OFFICE.

HENRY F. CRIM AND WILLIAM C. LOY, OF ROCHESTER, INDIANA, ASSIGNORS OF ONE-THIRD TO CHRISTIAN HOOVER, OF ROCHESTER, INDIANA.

LOCK FOR AUTOMOBILES.

No. 931,685.  Specification of Letters Patent.  Patented Aug. 17, 1909.

Application filed December 23, 1908. Serial No. 468,983.

*To all whom it may concern:*

Be it known that we, HENRY F. CRIM and WILLIAM C. LOY, citizens of the United States, residing at Rochester, in the county of Fulton and State of Indiana, have invented certain new and useful Improvements in Locks for Automobiles; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to locks for automobiles, and has for its object to provide a device for locking the steering column of an automobile in such manner that the machine can not be operated while the lock is in operative position on the steering column.

With this object in view our invention consists in the novel construction of the lock, and also in the construction which provides for adjustment of the shackle to fit columns of various sizes.

Figure 1:
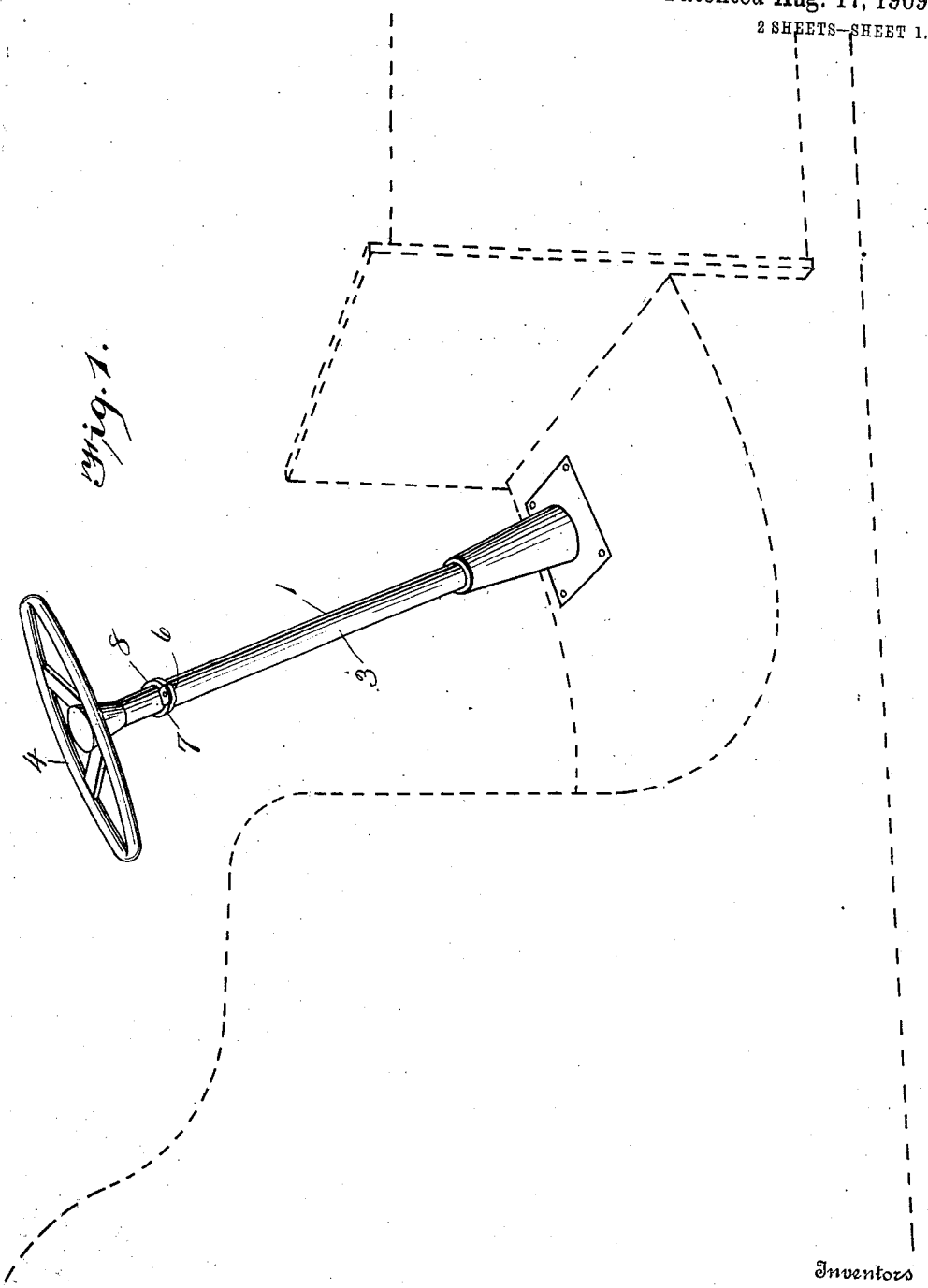
Figure 2:
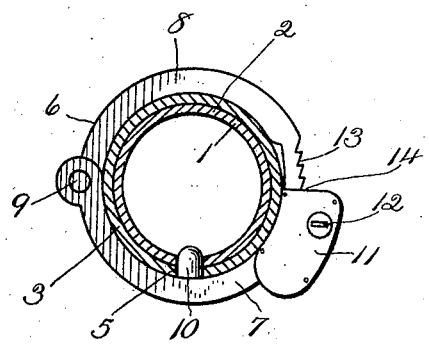
Figure 3:
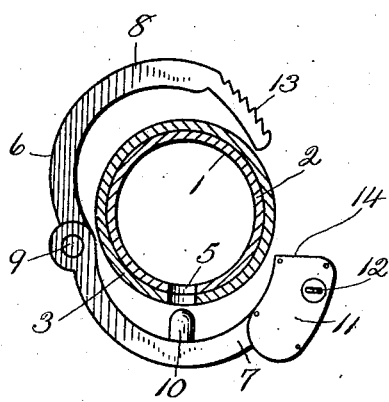
Figure 4:
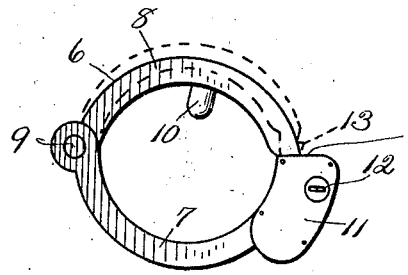

Referring to the accompanying drawings: Figure 1 is a perspective view showing our lock in operative position on the steering column of an automobile. Fig. 2 is a cross section through the steering column showing lock in position thereon. Fig. 3 is a cross section through the steering column showing lock disengaged therefrom, and Fig. 4 is a plan showing the shackle in two different positions and illustrating the adjustability thereof.

Like numerals of reference indicate the same parts throughout the several figures in which;

1 indicates the steering column of an automobile comprising an inner movable tube 2 and an outer stationary tube 3. To the inner tube 2 the steering wheel 4 is secured.

5 indicates an opening or perforation made in the outer tube 3 and inner tube 2 in such manner that an object passed through said perforation will prevent the inner tube 2 from rotating within the outer tube or sleeve 3, it being of course understood that the outer tube 3 is stationary and does not turn with the steering wheel 4.

6 indicates the lock as shown, comprising a substantially semicircular body 7 and a substantially semicircular shackle 8 pivoted to the body 7 at 9. Arranged preferably on the body 7 intermediate the ends thereof is an inwardly extending lug or projection 10, although this lug or projection 10 may be formed on the shackle 8 as shown in Fig. 4.

11 indicates the casing for the lock tumblers and 12 indicates the key slot. Suitable tumblers and a locking dog of any preferred construction are arranged within the casing and are commanded by a key.

The free end of the shackle 8 is provided with a series of notches or teeth 13 as shown, a recess or chamber 14 being provided in the casing 11 to receive the said free end of the shackle. Any one of notches or teeth 13 on the shackle 8 can be engaged by the locking bolt in such manner that the shackle 8 will snugly encompass the steering column.

Having thus fully described the several parts of our invention its operation is as follows: The tubes 2 and 3 of the steering column being perforated as described, the lock 6 is applied to the column as shown, the lug or projection 10 on the lock entering the perforation in the column passing through the outer tube 3 and entering the inner tube 2. The free end of the shackle 8 is then pressed into the casing 11 and is engaged by the locking dog therein and locked. Owing to the series of notches or teeth on the shackle, the shackle can be made to snugly engage the column as any one of the teeth on the shackle can be engaged by the locking bolt. The locking dog being preferably spring actuated, the same locks the shackle automatically, the key being only required to unlock the shackle.

Having thus fully described the operation of our invention, what we claim as new and desire to secure by Letters Patent of the United States, is:

A device for locking together an inner tube and an outer tube comprising a body, a lock, a shackle connected to and movable on said body, means on the device for passing through an outer tube and for entering an inner tube, the free end of said shackle being arranged to be retained by said lock, and means for adjusting the said shackle relative to the said lock to conform to the size of the tubes to be locked.

In testimony whereof, we affix our signatures, in presence of two witnesses.

HENRY F. CRIM.
WILLIAM C. LOY.

Witnesses:
  ENOCH MYERS,
  RUTH DAVIS.